J. REPETTI.
Attachments for Culinary Vessels.

No. 152,251.
Patented June 23, 1874.

Witnesses:
Millard F. Walton,
Benj. F. Hockley.

Inventor:
Joseph Repetti,
by John A. Wiederskeim & Co.
Attys.

UNITED STATES PATENT OFFICE.

JOSEPH REPETTI, OF PHILADELPHIA, PENNSYLVANIA, ASSIGNOR OF ONE-HALF HIS RIGHT TO ALEXANDER SINZHEIMER, OF SAME PLACE.

IMPROVEMENT IN ATTACHMENTS FOR CULINARY VESSELS.

Specification forming part of Letters Patent No. 152,251, dated June 23, 1874; application filed August 20, 1873.

*To all whom it may concern:*

Be it known that I, JOSEPH REPETTI, of the city and county of Philadelphia, and State of Pennsylvania, have invented a new and useful Improved Culinary Attachment; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1:
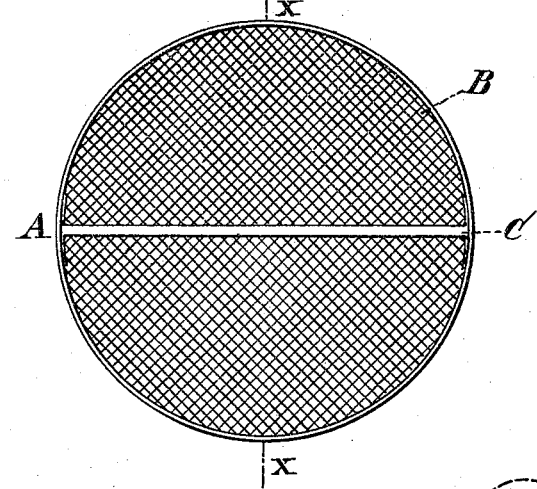
Figure 2:
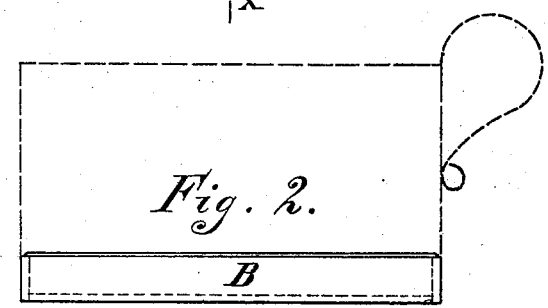
Figure 3:
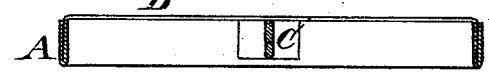

Figure 1 is a bottom view of the device embodying my invention. Fig. 2 is a side view thereof. Fig. 3 is a central vertical section thereof.

Similar letters of reference indicate corresponding parts in the several figures.

It is well known that in cooking or similarly preparing articles of food, burning of the food, injury to the bottom of the pot, pan, or kettle containing the same, and sticking of the food to said bottom, are common occurrences.

My invention is designed to remedy these defects; and consists in a tray applicable to a pot, pan, or other culinary vessel, and adapted to elevate the food above the bottom of the vessel, and properly support the same, so that the food cannot touch said bottom, and the regular cooking operations are in no wise interfered with, provision being made to prevent sagging or breaking of the center of the tray, the construction of the various parts being more fully hereinafter set forth.

Referring to the drawings, A represents a ring or band, which is adapted to be laid on the bottom of a pan, pot, or other similar cooking utensil. On one side of this ring or band, which will be the upper side, I attach a reticulated plate, B, consisting of wire-gauze, perforated metal, or other material, which plate completely occupies the space described by the ring or band, and is thus supported on the latter. The band A consists of a piece of metal bent or turned so that in cross-section it resembles the letter U, and into the space thus formed the side of the plate B is inserted and soldered, so that the connection between the two parts is firm and reliable, and danger of disengagement due to heat and usage is overcome. The ring will be of diameter or form equal to that of the lower part of the pan or vessel to which it is applied, so that there will be no space between the inner face of the vessel and outer face of the ring or band, in which condition, the ring resting on the bottom of the vessel, the plate B will be elevated above said bottom.

It will be seen that the food to be cooked cannot touch the bottom of the vessel; yet the operation of cooking is in no wise interfered with, even in the smallest article of food. The water circulates freely through the meshes of the plate B, especially if constructed of gauze. The food cannot stick or adhere to the bottom of the vessel, and, consequently, does not partake of the flavor of the lining of said bottom, or become broken in removal therefrom. Burning of the food is also prevented. The water may be exhausted, and the bottom of the vessel become heated, which would otherwise burn the food. This is avoided by my invention.

Owing to the weight on the plate of the food or article to be cooked, the center of the plate may "sag" and break. To prevent this I attach to the ring or band A one or more strips, C, which come under the plate B and brace it from side to side, thereby supporting the parts of the plate liable to give, but not affecting the operation hereinbefore stated.

Having thus described my invention, what I claim as new, and desire to secure by Letters Patent, is—

As an article of manufacture, the culinary attachment herein described, the same consisting of the reticulated plate B and the ring or band A, the latter being bent or turned to receive and hold the side of the plate, in combination with the strip C arranged under the plate, and all constructed and operating as set forth.

JOSEPH REPETTI.

Witnesses:
JOHN A. WIEDERSHEIM,
JNO. A. BELL.